United States Patent [19]

Christensen et al.

[11] 4,235,339
[45] Nov. 25, 1980

[54] LATCH AND CARRYING HANDLE ASSEMBLY FOR MAGNETIC RECORDING DISC CARTRIDGE

[75] Inventors: Dean L. Christensen, Long Beach; Leonard C. Badour, Santa Ana; Frank S. Ebey, Lakewood, all of Calif.

[73] Assignee: Memorex Corporation, Santa Clara, Calif.

[21] Appl. No.: 45,362

[22] Filed: Jun. 4, 1979

[51] Int. Cl.³ .................... G11B 23/02; B65D 85/30
[52] U.S. Cl. ................................. 206/444; 360/97; 360/133
[58] Field of Search ............... 206/444; 360/133, 97, 360/98, 99, 135

[56] References Cited

U.S. PATENT DOCUMENTS

| | | | |
|---|---|---|---|
| 3,882,701 | 5/1975 | Wirth | 206/444 |
| 4,013,169 | 3/1977 | Cheney | 206/444 |
| 4,071,862 | 1/1978 | Lathrop, Jr. et al. | 360/97 |
| 4,131,199 | 12/1978 | Hatchett et al. | 206/444 |
| 4,174,039 | 11/1979 | Frankhuizen | 206/444 |
| 4,194,228 | 3/1980 | Duff | 360/133 |

Primary Examiner—Joseph Man-Fu Moy

[57] ABSTRACT

In a magnetic recording disc cartridge having a recording disc contained within an upper housing and a separably mating lower housing, an improved latch and carrying handle includes a handle pivotally mounted to the upper housing, lifting apparatus selectively engageable with the recording disc for moving the disc axially away from the lower housing and including a pivotally mounted lifting bar and connected disc engaging element, a latch slidably mounted to the lifting bar for connecting the lifting bar and the handle together for pivotal movement, and a trigger engageable with the latch for moving the latch to its handle engaging position.

11 Claims, 12 Drawing Figures

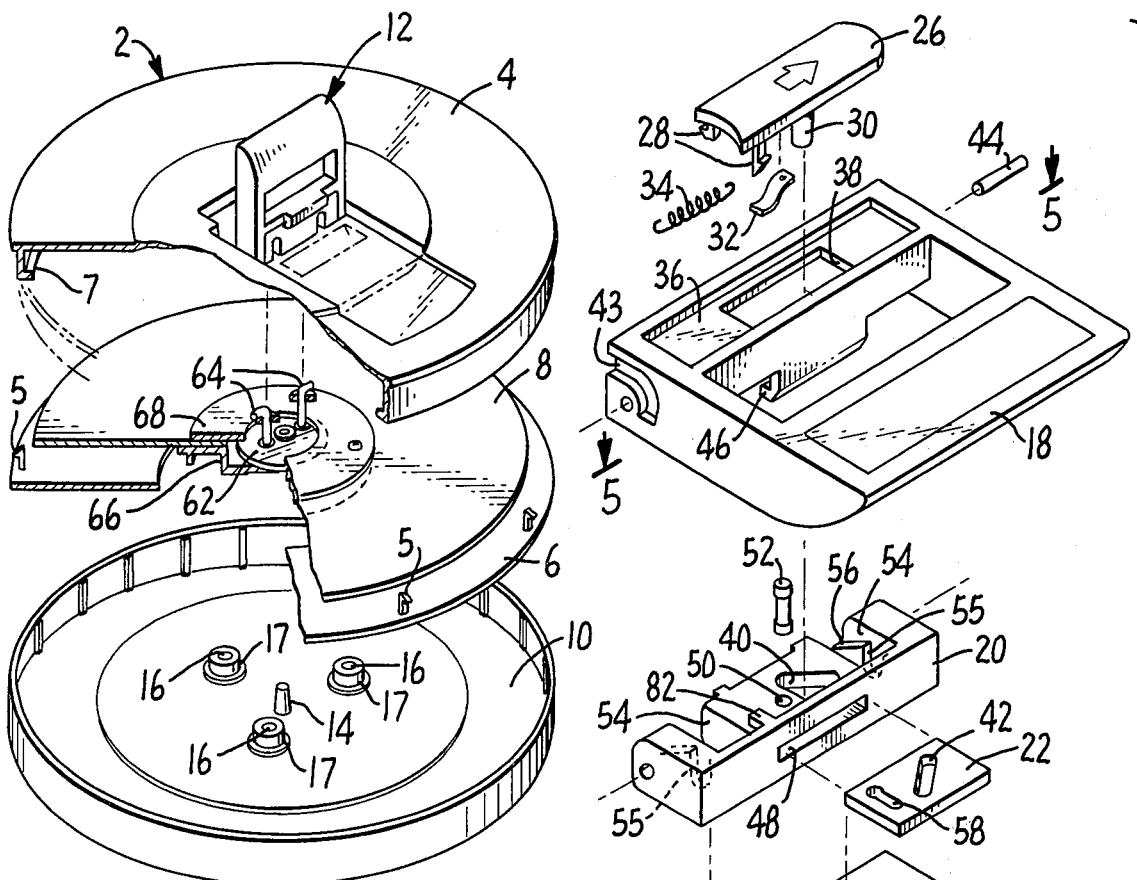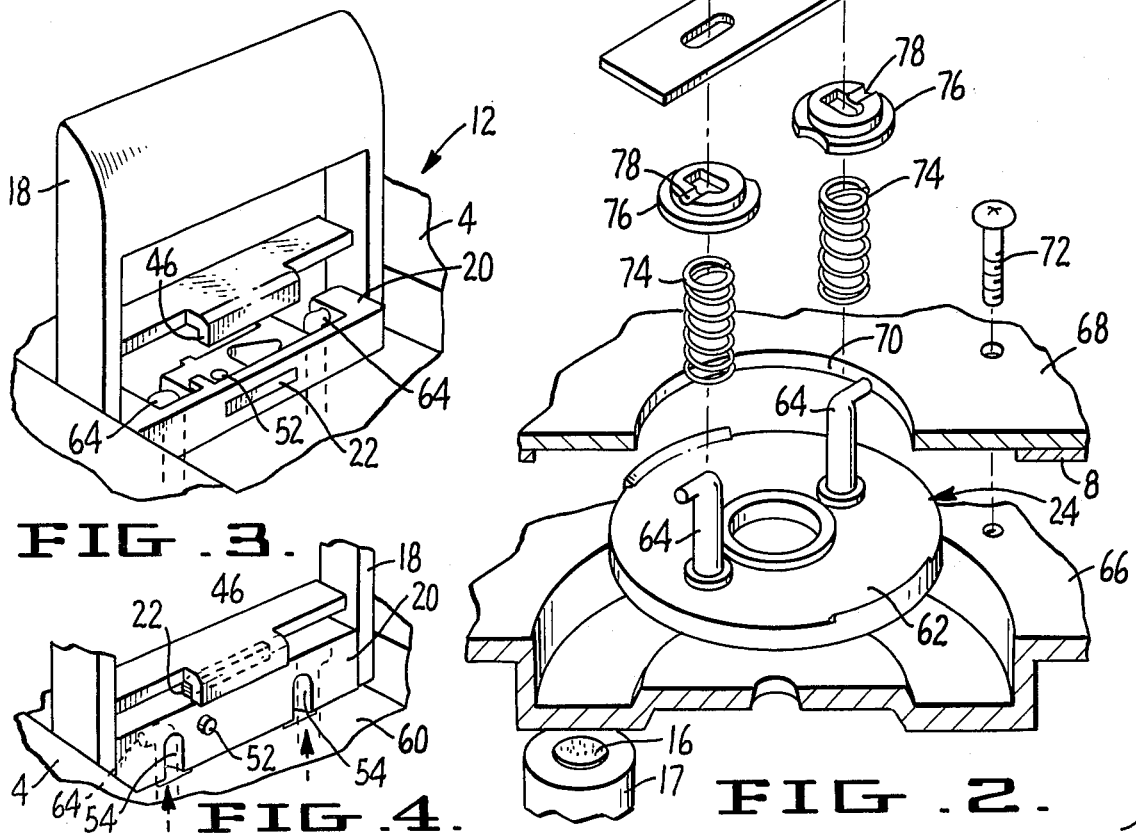

LATCH AND CARRYING HANDLE ASSEMBLY FOR MAGNETIC RECORDING DISC CARTRIDGE

BACKGROUND OF THE INVENTION

In the field of data processing equipment magnetic recording discs have long been used for providing readily accessible external data storage. Such discs have conventionally been used with suitable drive and recording apparatus and are frequently made readily removable from such apparatus. To provide for accurate, high-density recording of data on such recording discs, it has generally been found necessary to provide recording and reading heads extending inwardly of the periphery of the disc and spaced a very few thousandths of an inch above the surface of the disc. Because of this close head-to-disc spacing it is necessary that the surface of the disc be maintained essentially free of external contaminants such as dust and dirt. The presence of even tiny dust or dirt particles on the surface of the disc could result in interference between the dust particles and the disc and the recording head, thus resulting in what is commonly known as "head crash." Such an undesirable condition could result either in damage to the recording head or in distortion of the data recorded or read.

To maintain the surfaces of these magnetic recording discs substantially free from such contaminants when the discs are removed from the drive apparatus, as when they are stored, it has been conventional to enclose the discs in cartridges which substantially exclude such contaminants when the disc is removed from its drive. With certain types of cartridges a small access door is openable to permit access by the recording and playback heads to the disc surface. In other units such as that commonly known as a Memorex type 5440 disc cartridge the disc is contained within an upper housing which stays with the disc at all times. With this 5440 type cartridge the upper housing and the disc contained therewithin may be received within a separably mating lower housing which, with the upper housing, forms a substantially dust-tight enclosure. With this arrangement the upper housing and disc are mated with the lower housing as soon as the disc and upper housing are removed from the drive, thus protecting the disc surfaces.

In the 5440 type cartridge the lower housing is held securely to the disc and upper housing by engagement by magnets mounted to the lower housing with the steel hub of the disc contained in the upper housing. Separation of the upper and lower housings is effected by axial movement of the disc and its hub away from contact with those magnets. This axial movement has conventionally been provided by a lifting arrangement associated with a carrying handle pivotally connected to the upper housing, acting through a complex assembly in which a latch is slidably mounted to the handle and can be moved into position to engage an eccentrically operating structure for lifting the disc and its hub axially away from the lower housing. This arrangement, while functionally satisfactory, has comprised a rather complex assembly in which the component parts are expensive to manufacture and the entire structure is expensive and time consuming to assemble.

SUMMARY OF THE INVENTION

In view of the deficiencies relating to the expense and complexity of the carrying handle and latch arrangement for separating the disc and upper housing of a 5440 type cartridge from the lower housing in the prior art structure, it is an object of this invention to provide such a latch and carrying handle arrangement for such a cartridge which is far simpler and less expensive to manufacture and assemble. The invention contemplates a latch and carrying handle assembly for such a recording disc cartridge which includes a handle pivotally mounted to the upper housing for movement about a pivot axis extending generally parallel to the plane of the recording disc, with such movement being between one position lying generally parallel to the plane and another position generally normal to the disc plane and generally parallel to the disc axis. Also included are a lifting structure selectively engageable with the recording disc for moving the disc axially away from the lower housing, with such lifting structure comprising a pivotally mounted lifting bar and a disc-engaging element connected to the lifting bar eccentrically of its pivot axis. The latch is slidably mounted to the lifting bar for reciprocating movement, generally normal to the lifting bar pivot, between a first position out of engagement with the handle and a second position engaging the handle such that pivotal movement of the handle will effect corresponding pivotal movement of the lifting bar. A trigger engageable with the latch is providing for moving the latch between its first position and its second position.

BRIEF DESCRIPTION OF THE DRAWINGS

A particularly preferred embodiment of the apparatus of this invention will be described in detail in which:

FIG. 1 is an exploded perspective view of the magnetic disc cartridge with which the present invention is associated;

FIG. 2 is an exploded perspective view of the latch and handle apparatus of the present invention;

FIG. 3 is a fragmentary perspective view of the handle and latch assembly in the carrying configuration;

FIG. 4 is a fragmentary perspective view of the handle and latch assembly of FIG. 2 and a configuration to effect separation between the upper housing and lower housing of the cartridge;

DESCRIPTION OF A PREFERRED EMBODIMENT

Figure 5:
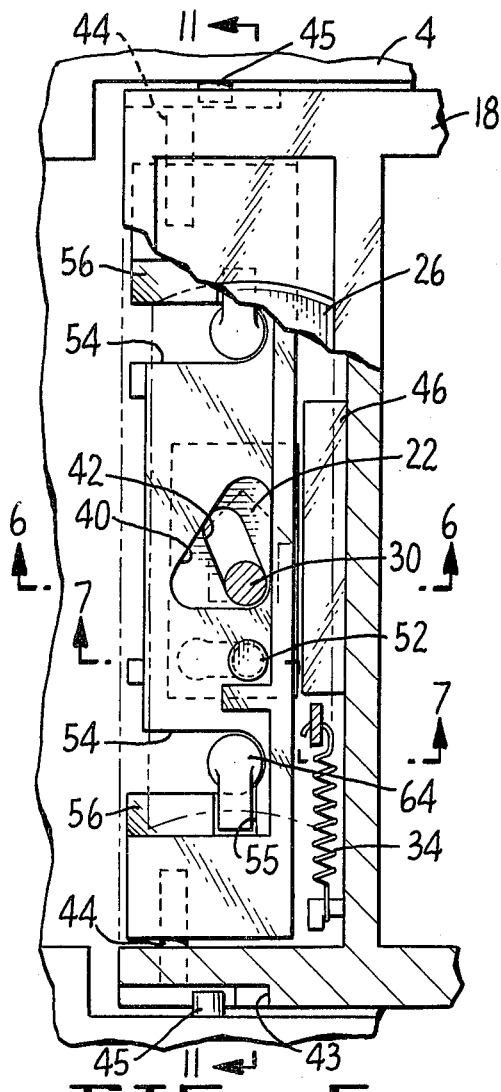
FIG. 5 is a fragmentary plan view, partially in section, of the latch arrangement of the present invention in its first position, out of engagement with the handle.

A particularly preferred embodiment of the apparatus of this invention is illustrated in the accompanying FIGS. 1 through 12. The basic components of the disc cartridge involved in this invention, which is substantially similar to the well known type 5440 cartridge except for the handle and latching arrangement, are illustrated in FIG. 1. These basic components include the upper housing 2 with its formed cover 4 and bottom plate 6, magnetic recording disc 8 and formed lower housing 10. The bottom plate 6 is attached to the upper housing cover 4 by a plurality of snap retaining catches 5 molded into the plate 6, which snap over a lip 7 in cover 4, with the disc 8 contained therewithin. Pivotally attached to the upper housing 4 is the handle and latch assembly 12. Mounted to or formed integrally with the lower housing 10 is disc centering post 14. Additionally, a plurality of magnets 16 are also mounted in bosses 17 attached to or formed with the lower housing 10, for purposes to be described below.

In the exploded view of FIG. 2 are illustrated the functional components of the latch and carrying handle assembly of this invention. These components include, basically, the handle 18, lifting bar 20, latch slide 22, disc engaging element 24 and trigger 26.

Attached to and, suitably, formed integrally with trigger 26 are retaining catch 28 and post 30. Also attached to the trigger 26 are leaf spring 32 and coiled tension spring 34, for purposes to be described below. The trigger 26 is received into recess 36 with the post 30, retaining catches 28 and leaf spring 32 extending through the aperture 38 in the handle 18. As shown best in FIGS. 6, 7 and 9, the retaining catches 28 snap under a portion of the lip surrounding aperture 38 to retain the trigger 26 in place. Post 30 extends through aperture 38 in the handle 18, through aperture 40 in the lifting bar 20 and projects into the aperture 42 in slide 22, for purposes to be described below.

Handle 18 is pivotally attached to lifting bar 20 by a pair of pivot pins 44. The handle and lifting bar assembly is attached to the cartridge by engagement with portions of the disc engaging member 24, as described below. Movement of the handle is guided by the cooperation between the L-shaped recesses 43 in the handle 18 and a pair of bosses 45 molded integrally with the upper housing cover 4. The pivot pins 44 and bosses 45 extend generally parallel to the plane of the recording disc 8. Attached to or, preferably, formed integrally with the handle 18 is a lip 46, which serves purposes to be described below.

Formed in lifting bar 20 is a slot 48 dimensioned to slidably receive latch slide 22 completely within that slot. Also formed in lifting bar 20 is a hole 50 through which is received trigger locking pin 52. Intermediate the ends of the lifting bar 20 there are also formed a pair of recesses 54, each of which recesses also include, suitably molded into the side thereof, a ramp 56 leading up to a U-shaped depression or socket 55, also for purposes to be described below.

Latch slide 22, in addition to the angled slot 42 forming a ramp therethrough, also includes adjacent one end an elongated slot 58, through which is received pin 52 when the slide 22 is inserted into the lifting bar 20. Immediately subjacent the lifting bar 20 is provided a thin, elongated low friction pad 60, suitably of a synthetic resin such as that known as Delrin. This pad 60 in the assembled disc cartridge lies immediately atop the outer surface of the upper housing cover 4.

As shown in the lower portion of FIG. 2, the disc engaging member 24 comprises a circular, disc-like portion 62 for contacting parts of the hub of the recording disc 8, and also at least one, and in this embodiment two, connecting portions 64 extending upwardly from the disc contacting portion 62. These connecting portions 64 in this embodiment preferably are generally L-shaped, and the entire disc contacting element 24 is suitably formed as a unitary member out of a suitable synthetic resin. The disc contacting member 24 is received within a hollow area formed in the hub of the disc 8, suitably defined by lower hub portion 66 and upper hub portion 68. Concentric with the disc in the upper hub portion 68 there is provided an aperture 70, suitably circular in configuration and dimensioned to be smaller than the diameter of the disc contacting portion 62 of the disc engaging member 24 but larger in diameter than the spacing of the two connecting members 64 so that those members 64 may project freely through the aperture 70. When the upper hub portion 68 is attached to the lower hub portions 66, suitably by threaded fasteners 72, the disc engaging element 24 in the hollow area between the two disc hub portions 66 and 68 is loosely captured within that hollow and cannot be removed.

Fitting over each of the connecting members 64 are compression springs 74 and spring retainers 76. The disc-like spring retainers 76 have slots through the center dimensioned to slip over the radially outwardly projecting extremities of the connecting members 64 when the slots are aligned with those extremities, but being captured on those connecting portions 64 when the spring retaining discs 76 are rotated to another position, such as that illustrated in FIG. 2. In that rotated position the small hollows 78 will engage the radially outwardly facing extremities of the connecting portions 64 and thus serve to retain the springs 74, suitably slightly compressed, on the connecting portion 64 during assembly.

At the extreme bottom of FIG. 2 is shown one of the magnets 16 which engages the steel hub of the disc 8 to retain the housing closed. This magnet 16 suitably is enclosed within a boss 17 formed with or attached to the lower cover 10 of the cartridge.

All of the components of the cartridge except for the disc and its hub, the springs and the pivot pins are formed of a suitable synthetic resin. From the description of these parts with respect to FIG. 2, the uniquely simple and rapid manner of assembly may be seen. Springs 74 are slipped over connecting members 64 of the disc contacting element 24 and then are compressed by the insertion of the spring retaining discs 76 over those members 64, with those retaining discs 76 then being given a quarter turn to retain them in place. Then the entire disc engaging element 24 is captured within the components of the recording disc hub when that hub is assembled. Next the upper cover 4 of the upper housing 2 is placed over the recording disc with the connecting portions 64 of the disc engaging member 24 projecting through one or more apertures in that cover. The low friction pad 60 is then slipped over the upwardly projecting connecting portions 64. In the meantime, slide 22 has been assembled to lifting bar 20 by insertion into the slot 48 sufficiently that the enlarged portion of the slot 58 in slide 22 is aligned with the hole 50 through the lifting bar 20. The pin 52 suitably is of a constant and predetermined diameter intermediate the ends, with the end being of a slightly larger diameter. The slot 58 in slide 22 preferably is dimensioned such that the enlarged end portions may be inserted only through the enlarged portion of the slot with the remainder of the slot being of such a width that the central portion of the pin 52 will slide freely while preventing the enlarged end portions from passing therethrough. Thus, with the enlarged end portion of the slot 58 in slide 22 aligned with hole 50, the pin 52 may be inserted into both the lifting bar 20 and the slide 22, with that slide 22 then being moved toward the pivot axis of lifting bar 20 and thus capturing the pin 52.

Handle 18 is assembled with trigger 26 in the following manner. The resilient member or leaf spring 32 is attached to trigger 26 by any suitable method, such as by heat staking or by pressing it onto a pin. Then trigger 26 is snapped into the aperture 38 in handle 18 with the toothed portions 28 snapping under the edges of the lip of that aperture 38. The coil spring 34 is then attached between the trigger and the handle to urge the trigger in the direction opposite that indicated by the arrow illustrated on the trigger.

With the lifting bar 20 and slide 22 assembled, and the handle 18 assembled with trigger 26 and the associated springs, these two subassemblies are then pivotally joined together by placing the handle 18 over the lifting bar 20 with the holes for pivot pins 44 aligned, and then inserting both of the pivot pins 44 through the handle 18 and into the lifting bar 20.

For the final assembly, with the connecting member 64 of the disc engaging element 24 projecting up through the apertures in the upper housing cover 4 and through the apertures in low friction pad 60, the handle and lifting bar subassemblies are assembled thereto by sliding the lifting bar 20 under the L-shaped extremities of the connecting member 64. Thus, these radially projecting portions of the connecting member 64 slide up the ramps 56 and snap into the generally U-shaped sockets 55 in the lifting bar, being retained there by the resilient urging of the spring 74 urging those connecting portion extremities down into those sockets as the springs urge the disc engaging member away from the lifting bar. As the lifting bar/handle assembly is inserted into place on the extremities of the connecting member 64, the bosses 45 on the upper housing cover 4 are simultaneously being received into the recesses 43 on the handle 18. The resilient retention of the lifting bar and handle assembly by the connecting member 64 serves to hold the handle and lifting bar assembly in place, with the engagement between the bosses 45 and the recesses 43 serving only to guide the movement of the handle when it is pivoted between a generally horizontal and generally vertical position. With this assembly completed it may be seen that handle 18 may be pivoted downwardly and the trigger 26 moved until the pin 30 projects down through the aperture 40 and into the angled slot 42 in slide 22. Thus, the assembly of this disc cartridge can be completed very quickly and easily with a minimum number of tools and relatively little labor.

Figure 9:
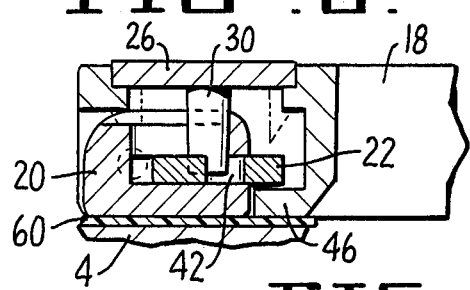
FIG. 9 is a side sectional view of the apparatus of FIG. 8 taken along lines 9—9.
Figure 10:
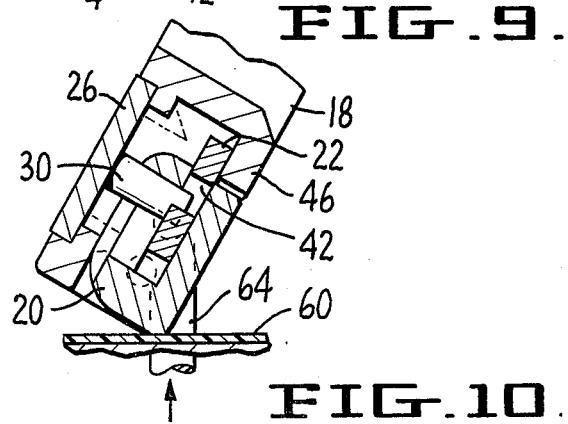
FIG. 10 is a side sectional view of the apparatus of FIG. 8 with the handle pivoted partially toward its upward, bottom cover-releasing position.
Figure 11:
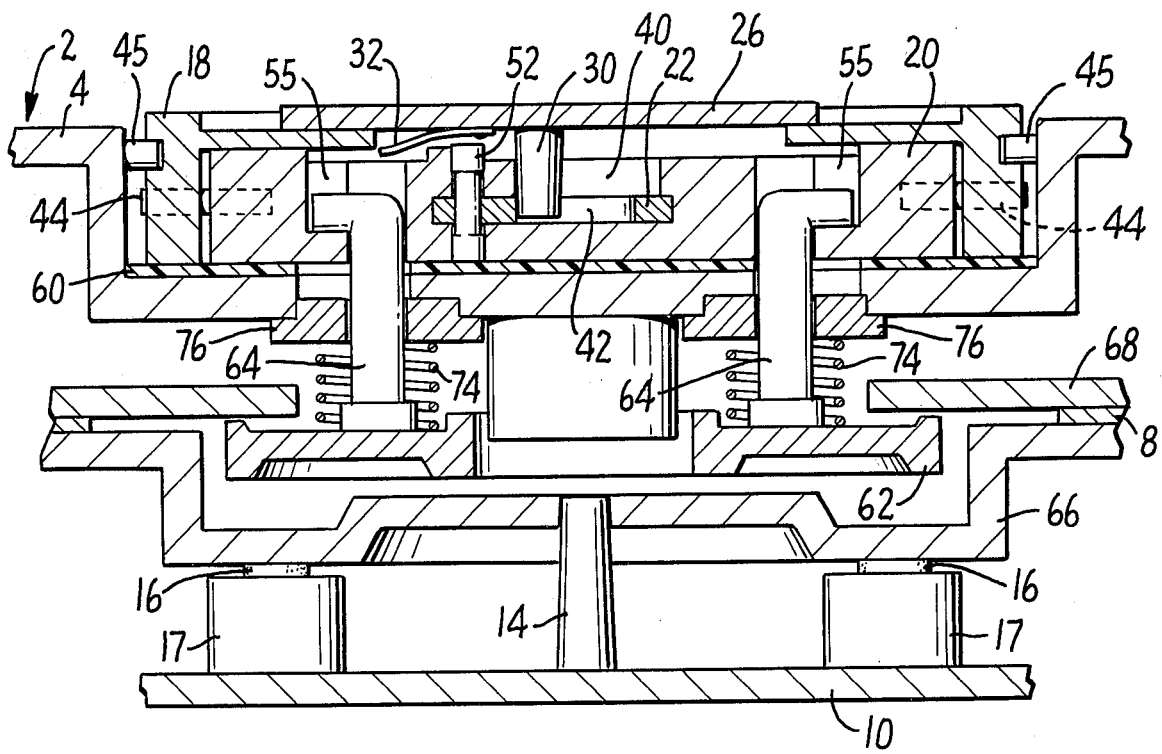
FIG. 11 is a fragmentary side sectional view of the apparatus of FIG. 5 taken along lines 11—11, in which the bottom housing is engaged with the disc hub.

The manner of operation of this handle and latch assembly is shown in detail in FIGS. 3 through 12. In FIG. 11 is illustrated a cross-sectional view of a disc cartridge incorporating the present invention, with that cartridge in its closed configuration with the upper housing 2 mating with the lower housing 10 to enclose the disc within its substantially dust-tight enclosure. In this closed configuration the steel lower hub portion 66 of the disc is engaged by the magnets 16 mounted to the lower housing 10 by bosses 17, with the disc centering post 14 received through an appropriately dimensioned central hole in that lower hub portion. In this configuration engagement between the lower hub portion 66 and a portion of the upper housing bottom plate 6 (not shown) serves to hold the upper housing 2 against the lower housing 10 to achieve the desired mating of the housing portions.

Figure 6:
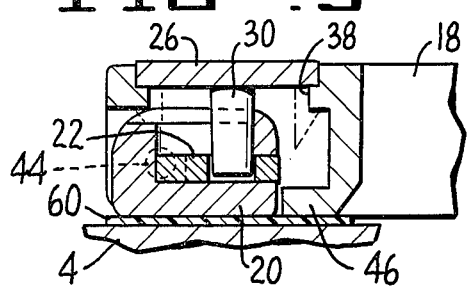
FIG. 6 is a side sectional view taken along lines 6—6 of FIG. 5.
Figure 7:
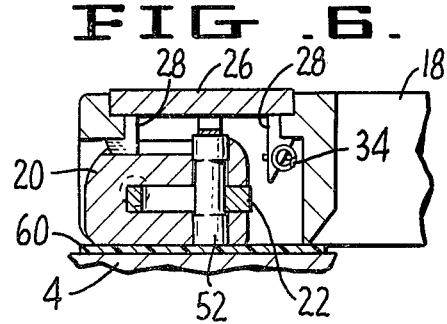
FIG. 7 is a side sectional view taken along lines 7—7 of FIG. 5.

A plan view in section and side sectional views of the handle and latching arrangement in the configuration illustrated in FIG. 11 are shown in FIGS. 5 through 7. In this configuration the trigger 26 has not been actuated to move it from the position toward which it is urged by coil spring 34, and thus the trigger 26 remains in its left-most position in FIG. 11 and lowermost position in FIG. 5. position is defined by the engagement of trigger post 30 with the edge of the slot 42 which is left-most in FIG. 11 and lower most in FIG. 5. By virtue of the angled orientation of the slot 42 in the slide 22, the position of the trigger post 30 as shown in FIGS. 5 and 11 serves to cam the slide 22 to its position fully retracted within the slot 48 in lifting bar 20. In this position the latch slide 22 is out of engagement from the handle lip 46, thus permitting the handle to pivot independently of any movement of the latch slide 22 or lifting bar 20. Thus, if it is desired to transport the entire, enclosed disc cartridge, the handle 18 may simply be pivoted upwardly for carrying, as shown in FIG. 3, with the disc lifting bar 20 remaining in the position illustrated in FIG. 11, thus permitting the engagement between the disc hub and the lower housing magnet 16 to maintain the cartridge closed.

Figure 8:
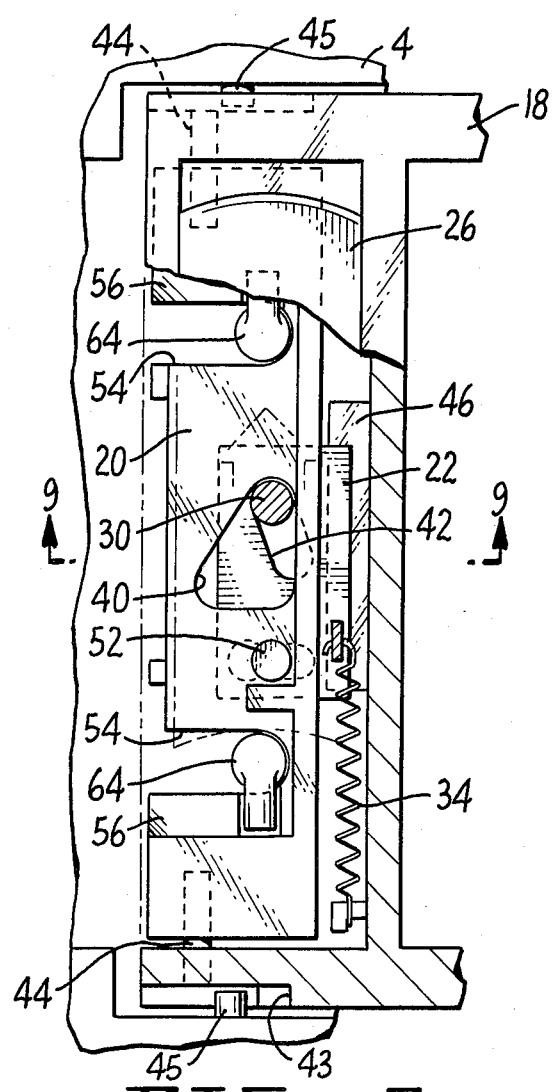
FIG. 8 is a fragmentary plan view, partially in section, of the latch assembly of this invention with the latch in its second position engaging the handle.
Figure 12:
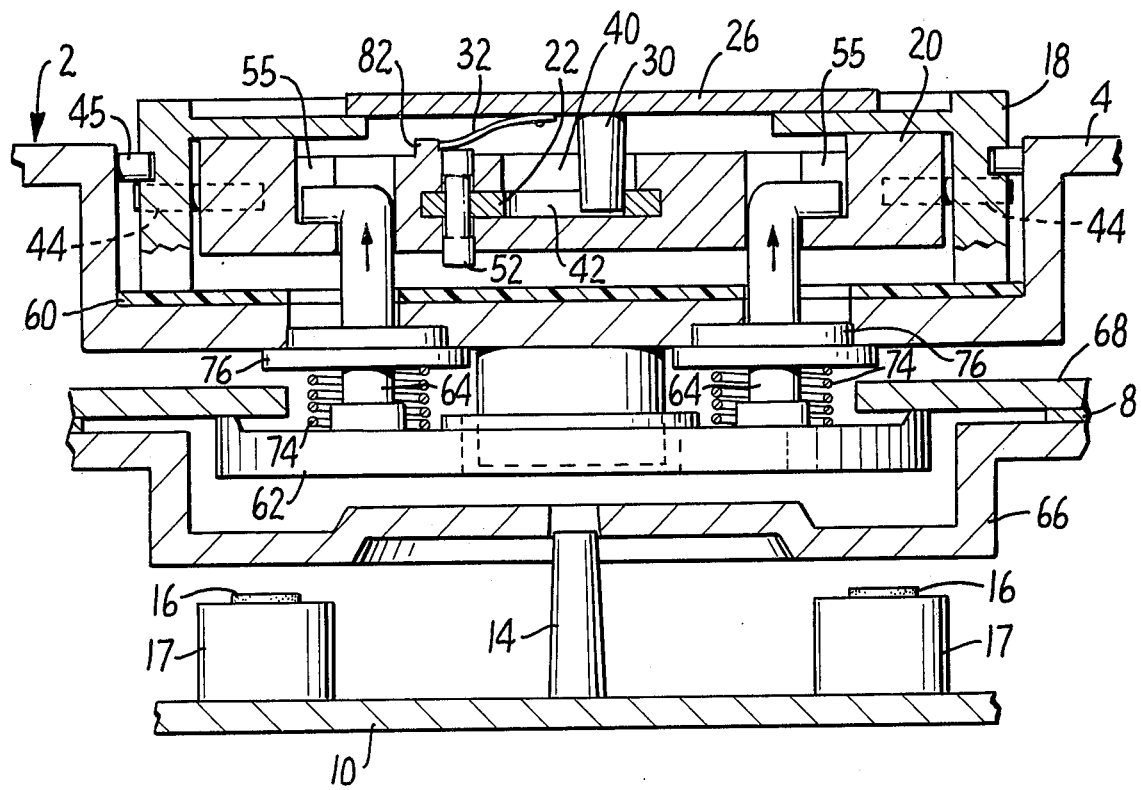
FIG. 12 is a side sectional view similar to that of FIG. 11, in which the handle and latching arrangement has been pivoted to the position illustrated in FIG. 10.

When it is desired to open the disc cartridge, such as for loading the disc onto an appropriate disc drive, the trigger 26 is actuated by moving it to the position illustrated in FIGS. 8, 9 and 12. By moving the trigger 26 to the illustrated position (upwardly in FIG. 8 and to the right in FIG. 12) the trigger post 30, serving as a cam, advances along the inclined slot 42, serving as a ramp, and thus cams the latch slide 22 outwardly of the slot 48 to a position overlying the handle lip 46, as particularly shown in FIGS. 8 and 9. With the trigger 26 and latch slide 22 being urged to this position, against the pull of spring 34, upward pivoting of the handle 18 will cause the handle lip 46 to engage the outwardly projecting portion of latch slide 22 and thus pivot lifting bar 20 upwardly as shown in FIGS. 10 and 12.

When the trigger 26 is moved to the position shown in FIGS. 8 and 12, the free end of leaf spring 32 passes beyond the raised ledge 82 formed on the top of lifting bar 20. As the handle 18 and lifting bar 20 are pivoted upwardly, this action lifts the pin 52 in lifting bar 20 free from its engagement with the low friction pad 60 and permits the resilient leaf spring 32 to urge the pin 52 downwardly as shown in FIG. 12. Thus, the end of leaf spring 32 moves into interfering relationship with the abutment 82 on the lifting bar 20. This engagement between the leaf spring 32 and the abutment 82 prevents the trigger 26 from returning to the position illustrated in FIG. 11 and thus maintains engagement between latch slide 22, lifting bar 20 and handle 18. As shown in FIGS. 10 and 12, by virtue of the positioning of the slots 55 which engage and support the disc engaging member connecting portion 64, eccentric of the pivot axis defined by the lower rear corner of the handle 18, pivoting of the handle and lifting bar as shown in FIG. 10 lifts those connecting portions 64 upwardly. Such lifting brings disc contacting portion 62 into engagement with the underside of disc hub upper portion 68, thus pulling the disc hub free from its engagement with the magnets 16 attached to the lower housing 10, even though the lower housing 10 may still be engaging the upper housing 2. This action, resisted by the resilient compression springs 74, frees the disc 8 and upper housing 2 from connecting retention with lower housing 10.

The configuration of the handle and latch assembly when in the disc lifting position described immediately above is substantially as shown in FIG. 4.

When the disc and upper housing 2 have been moved to the desired new location, for example, either engaged with a disc drive (not shown) or returned to the lower housing 10, the disc may be lowered back to its position for engaging either the disc drive spindle or engaging the retaining magnets 16 and centering post 14 of the lower housing 10. This lowering is achieved by pivoting the handle, and engaged lifting bar 20, from its lifting and carrying position aligned generally parallel to the disc axis and generally perpendicular to the disc surface, to the retracted position, generally parallel to the disc surface. This pivoting of the handle and lifting bar 20 back to this retracted position serves to lower the U-shaped sockets 55 and thus the disc engaging member connecting portions 64 and disc contacting portions 62 by virtue of the eccentric positioning of the sockets 55 with respect to the pivoting of handle 18. The compression springs 74 acting against spring retaining disc 76 and thus the underside of upper housing cover 4 further urge the disc engaging portion 62 downwardly as the handle and lifting bar are pivoted to their retracted position. When the disc contacting portion 62 of the disc engaging member has moved to its lowermost position, it is spaced slightly from the underside of the disc hub upper portion 68, as shown in FIG. 11. In this condition, when the disc is received within the lower housing, as shown in FIG. 11, it is retained by its engagement with the magnets 16. When installed on a disc drive, the spacing of the disc contacting portion 62 out of contact with the hub and with the disc supported out of contact with the upper housing 2 permits the disc to spin freely without drag or interference from any portions of the housing or disc lifting apparatus.

When the handle 18 and lifting bar 20 are pivoted to this retracted position, generally parallel to the disc surface, the lowermost portion of trigger locking pin 52, which has been projecting below the lower surface of lifting bar 20, is brought into contact with low friction pad 60. Continued pivoting of the handle and lifting bar to the fully retracted position thus forces pin 52 upwardly, in turn forcing the free end of leaf spring 32 upwardly and out of engagement with the lifting bar abutment 82. Since it has been the engagement between leaf spring 32 and the abutment 82 that has retained the trigger in its actuated position, the termination of such engagement permits the trigger 26 to return to its non-actuated position, that illustrated in FIGS. 5 and 11, under the influence of spring 34. This movement of the trigger 26 accordingly moves its post 30 along the inclined, ramp-like slot 42 in latch slide 22, thus camming the slide 22 toward its retracted position, shown in FIGS. 5 and 6. In this position the latch slide 22 no longer overlies lip 46 of the handle 18 so that any pivoting of the handle 18 will not cause pivoting movement of the lifting bar 20 but will simply move the handle independently of the lifting bar, in the manner illustrated in FIG. 3.

From all the foregoing may be seen both the construction, simplified assembly and manner of operation of the handle and latch assembly of this invention is utilized with a disc cartridge, suitably of the Memorex Model 5440 type. While the foregoing description illustrates in detail this particularly preferred embodiment of the invention, it is to be recognized that numerous variations and modifications of the structure, all within the scope of the invention, will readily occur to those skilled in the art. Accordingly, the scope of this invention is to be defined not by the foregoing illustrative description but by the claims appended hereto.

What is claimed is:

1. In a magnetic recording disc cartridge having a recording disc contained within an upper housing and a separably mating lower housing and in which separation of said lower housing is effected by lifting said recording disc axially away from magnetic engagement with the portion of said lower housing which extends transversely of the disc axis, an improved latch and carrying handle comprising a handle pivotally mounted to said upper housing for movement about a pivot axis which extends generally parallel to the plane of said recording disc, said movement being between one position lying generally parallel to said disc plane and another position generally normal to said disc plane and generally parallel to said disc axis;

lifting means selectively engageable with said recording disc for moving said disc axially away from said lower housing, said lifting means comprising a pivotally mounted lifting bar and a disc-engaging element connected to said lifting bar eccentrically of the axis of said lifting bar pivot whereby pivotal movement of said lifting bar will effect a lifting of the disc-engaging element and thus of the disc;

latch means slidably mounted to said lifting bar for reciprocating movement, in a direction generally normal to said lifting bar pivot axis, between a first position out of engagement with said handle and a second position engaging said handle such that, when said latch means is in said second position, pivotal movement of said handle will effect corresponding pivotal movement of said lifting bar, thereby lifting the disc; and movable trigger means engageable with said latch means for moving said latch means between said first position and said second position.

2. The latch and carrying handle of claim 1 wherein said handle pivot axis is coaxial with the pivot axis of said lifting bar pivotal mounting.

3. The latch and handle of claim 1 wherein said reciprocal movement of said latch means is effected by relative movement between the parts of a cam and ramp assembly forming parts of said trigger means and said latch means, whereby the relative movement between the cam and ramp parts serves to cam the latch toward its second position engaging the handle.

4. The latch and handle of claim 1 further comprising means for maintaining said trigger in position holding said latch in said second position at all times that said lifting bar and handle are pivoted substantially toward said other position, whereby the latch is caused to engage the handle at all such times.

5. The latch and handle of claim 4 wherein said trigger position maintaining means is attached to said trigger means for releasably engaging a portion of said lifting bar to maintain said trigger means in position holding said latch means in said second position.

6. The latch and handle of claim 4 further comprising means positively disengaging said trigger position maintaining means wherever said handle is in said one position generally parallel to said disc plane, whereby the trigger means may be moved to its position in which the latch means is in its first position when the handle is in its said one position.

7. The latch and handle of claim 6 wherein said trigger position maintaining means comprises a resilient member attached to said trigger means releasably engaging a portion of said lifting bar when said trigger means has moved said latch means to said second position and said handle and lifting bar have been pivoted toward said second position, and wherein said positively disengaging means comprises an element movably mounted to said lifting bar for forcing said resilient member out of engagement with said lifting bar when said lifting bar and handle are pivoted to said first position.

8. The latch and handle of claim 1 wherein said disc-engaging element includes one portion contacting said recording disc, another portion connecting said disc contacting portion to said lifting bar and means resiliently urging said disc contacting portion away from said lifting bar, and wherein said lifting bar includes generally U-shaped socket means into which said connecting portion is received and within which said connecting portion is retained by said resiliently urging means.

9. The latch and handle of claim 8 wherein said generally U-shaped socket faces in one predetermined direction with respect to said lifting bar and is adjacent a recess extending inwardly of one side of said lifting bar in a direction generally normal to said socket facing direction, whereby the disc-engaging connecting portion may be introduced into the lifting bar recess and thence inserted into the generally U-shaped socket.

10. The latch and handle of claim 9 wherein said lifting bar further includes ramp means extending alongside said recess and leading from said one side of said lifting bar to said U-shaped socket for slidably engaging said disc-engaging member connecting portion as said connecting portion is introduced into said lifting bar recess, whereby the disc-engaging member may be assembled to the lifting bar by sliding the connecting portion along the ramp and into the generally U-shaped socket.

11. The latch and handle of claim 8 wherein said disc-engaging element comprises a unitary member formed of synthetic resin.

* * * * *